United States Patent [19]

Gérard

[11] Patent Number: 4,718,781
[45] Date of Patent: Jan. 12, 1988

[54] PRE-STRESSED BALL BEARING AND METHOD AND TOOL FOR ITS MANUFACTURE

[75] Inventor: Stephan Gérard, Croissy, France

[73] Assignee: Nadella, Vierzon, France

[21] Appl. No.: 10,394

[22] Filed: Feb. 3, 1987

[30] Foreign Application Priority Data

Feb. 7, 1986 [FR] France .................. 8601718

[51] Int. Cl.$^4$ ............................. F16C 23/08
[52] U.S. Cl. ...................... 384/495; 384/505; 384/516; 384/517; 384/536; 384/537
[58] Field of Search .......... 384/495, 505, 516, 513, 384/517, 536, 500, 537

[56] References Cited

U.S. PATENT DOCUMENTS 3,756,675 9/1973 Mangiavacchi .............. 384/536
3,801,171 4/1974 Rozentals ..................... 384/505

FOREIGN PATENT DOCUMENTS 0042325 12/1981 European Pat. Off. .
699117 11/1940 Fed. Rep. of Germany .
2069550 11/1970 France .
2069549 3/1971 France .
2549174 1/1985 France .

Primary Examiner—Lenard A. Footland
Attorney, Agent, or Firm—Robert E. Burns; Emanuel J. Lobato

[57] ABSTRACT

The invention concerns ball bearings which automatically take up play, are self-centering and self-adaptable to the stress. The bearing comprises an inner ring (1), an outer ring in two parts (2a, 2b), balls (3), an elastically yieldable element (4) and a case (5). One of the rings is formed of two parts (2a, 2b) which are relatively movably fitted together and some of the four rolling raceways along which the balls roll have set-back depressions arranged along their circumference. Application in particular in the automobile industry.

7 Claims, 8 Drawing Figures

PRE-STRESSED BALL BEARING AND METHOD AND TOOL FOR ITS MANUFACTURE

The present invention relates to ball bearings and more particularly ball bearings having an initial pre-stress.

It has already been proposed to manufacture pre-stressed ball bearings employing elastically yieldable elements for automatically taking up the clearances and, at the same time, damping vibrations to which the ball bearings are subjected and which they are liable to transmit.

In French patent application No. 83 11 711, the applicant has described a pre-stressed rolling bearing having two series of rolling members. The rolling members employed are rollers or balls disposed in two distinct rows so as to afford the radial and axial maintenance while providing a damping of the vibrations and being free from play.

This rolling bearing, whose advantages are known has the drawback of being excessively long in its axial di- rection.

An object of the invention is to overcome this drawback by means of the rolling bearing according to the invention which retains the foregoing qualities and yet is more compact.

The invention provides a ball bearing, a method for manufacturing a ring of this ball bearing and a tool for carrying out said method.

The pre-stressed rolling bearing according to the invention comprises a case, a inner ring, an outer ring, rolling members disposed between the inner and outer rings, and at least one elastically yieldable element compressed in the case between the case and one of the rings so as to apply the rolling members into contact with the inner and outer rings along circular raceways. In this rolling bearing, the rolling members are balls, each rolling member travels along four contact raceways of which two are located on the inner ring and two on the outer ring, one of the rings is in two parts on each of which parts is located one of the contact raceways and which are freely movably engaged one inside the other so as to transmit the pre-stress of the elastically yieldable element, and set-back depressions are provided on raceways.

The invention provides a method for manufacturing a ball bearing ring having two raceways which are described by the points of contact of the balls and which are provided on confronting flanks of a groove whose cross-sectional shape resembles a V, said method comprising a step for forming from a sheet or a tube an inverted W-shaped accordeon fold, a step for surfacing regions of the flanks which are in confronting relation of the V-shaped groove of the inverted W-shaped accordeon fold for the raceways by a simultaneous pressing and striking of the whole of the circumference, and forming, in the course of the surfacing of the set-back depressions arranged along the circumference of the raceways, all the operations being effected without removal of the material.

The invention also provides a tool for carrying out the method just mentioned used for the surfacing, in particular of two raceways which are described by points of contact of the balls of a rolling bearing on its ring and which are located on the confronting flanks of a groove whose cross-sectional shape resembles a V. Said tool comprises at least two movable elements which, when they are joined together define a circular central orifice, a cross-section through a meridian plane having a convex profile adapted to cooperate with the flanks for surfacing them in the region of the raceways and there being provided on each of the movable elements close to the joint plane a projection projecting toward the centre on the part of the profile adapted to surface the region of the raceways.

Further features of the invention will be apparent from the following description with reference to the accompanying drawings, in which.

The ball bearing according to the invention has the feature of being "self-aligning", i.e. of accepting a certain centering defect and of also being self-adaptable to the pre-stress to which it is subjected. This ball bearing also has a particularly interesting advantage in that its dimension measured in a direction parallel to its axis of rotation is notably reduced relative to that of needle or roller bearings. The saving in space thus achieved enables the rolling bearing according to the invention to be included in assemblies where problems of overall size are criticle parameters.

The ball bearing according to the invention also has the advantage of having no play and having the capacity of absorbing vibrations to which it is subjected.

Figure 1:
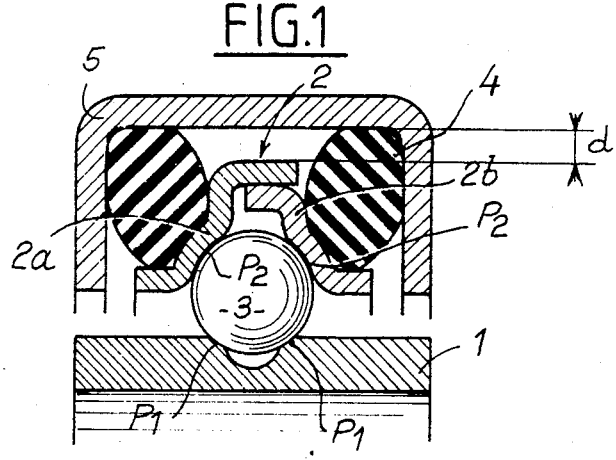
FIG. 1 is a partial meridian cross-sectional view of an embodiment of a ball bearing having four contact raceways according to the invention.

As can be seen in FIG. 1, the ball bearing according to the invention comprises an inner ring 1 and an outer ring 2 between which are disposed balls 3. The ball bearing further comprises a case 5 in which are disposed two O-rings of elastomer which are pre-stressed upon asssembly and which transmit their load to the outer ring 2.

As can be clearly seen in FIG. 1, according to one feature of the invention, each ball 3 has two points of contact $P_1$ with the ring 1 and two points of contact $P_2$ with the ring 2.

As also seen in FIG. 1, one of the rings, namely the outer ring in the presently-described embodiment, is formed in two parts 2a and 2b which are freely movably fitted one inside the other so as to transmit the pre-stress of the O-rings 4 to the balls. An examination of the drawing will show clearly that, with the adopted arrangement, the ball bearing according to the invention is self-aligning and self-adaptable to the stresses and automatically takes up play.

The rolling bearing according to the invention has yet another feature of having a limited capacity to become eccentric or out of alignment.

In some applications, the bearing is subjected to a radial non-uniform load which produces a relative displacement of the outer ring 2 relative to its housing, i.e. to its case 5. This displacement results in an eccentricity or disalignment which may prejudice correct operation if its magnitude is not limited. In order to overcome such a drawback, the outside diameter of the ring 2 and the inside diameter of the case 5 are given such dimensions as to provide a gap d (FIG. 1) which determines the maximum extent of the disalignment which is acceptable. Indeed, under the effect of the radial resultant the outer ring will become eccentric and the extent of the offset, which is a function of the magnitude of the resultant will be limited by the ring encountering the case.

Figure 2:
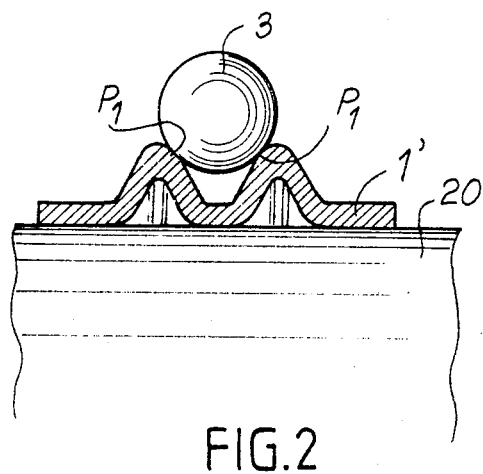
FIG. 2 is a detail view of one of the rings obtained by the method according to the invention.

According to another feature of the invention, one of the rings, namely the inner ring in the presently-described embodiment, may be made directly from a metal sheet or a tube which is subjected to a forming operation. In FIG. 2, it can be seen that the inner ring 1 has an inverted W-cross-sectional shape, in the form of an accordeon fold whose two confronting flanks of the V carry raceways for the balls described by their points of contact $P_1$. It is clear that, in their path, the points of contact $P_1$ of the balls on the flanks of the inner ring describe circles.

In order to obtain a good bearing, and therefore an improved rolling of the balls on the rings, it is conventional to finish the regions of the rings where the raceways for the balls are located, for example by machining or rolling, but this type of operation is long and costly.

One of the objects of the invention is to avoid this finishing machining.

According to the invention, to obtain the surfacing and thus ensure a good rolling action, of the confronting regions of the flanks of the V-shaped groove of the inverted W-shaped accordeon fold, the whole of the circumference is simultaneously struck or pressed and there are created, upon the striking, setback depressions which are arranged along the circumference of the raceways, all these operations being carried out without removal of the material.

Figure 4:
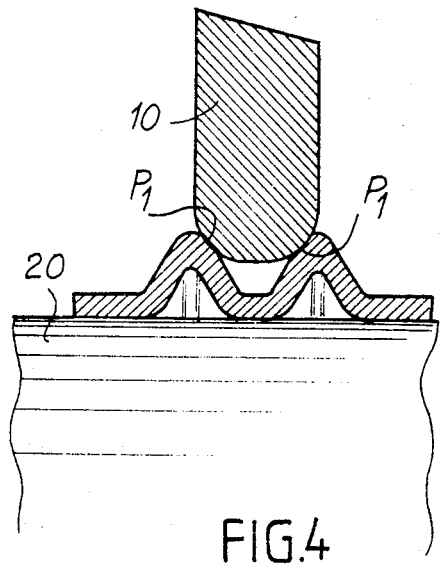
FIG. 4 is a partial meridian sectional view of the manner in which the tool surfaces the raceways of a ring according to the invention.
Figure 3:
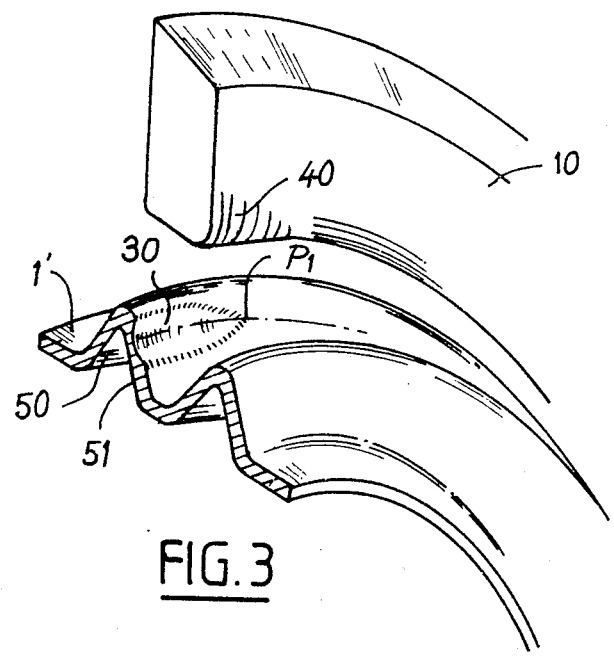
FIG. 3 is an isometric partial view of a ring obtained according to the method of the invention by means of a tool according to the invention there being shown one of the depressions of a raceway.
Figure 6:
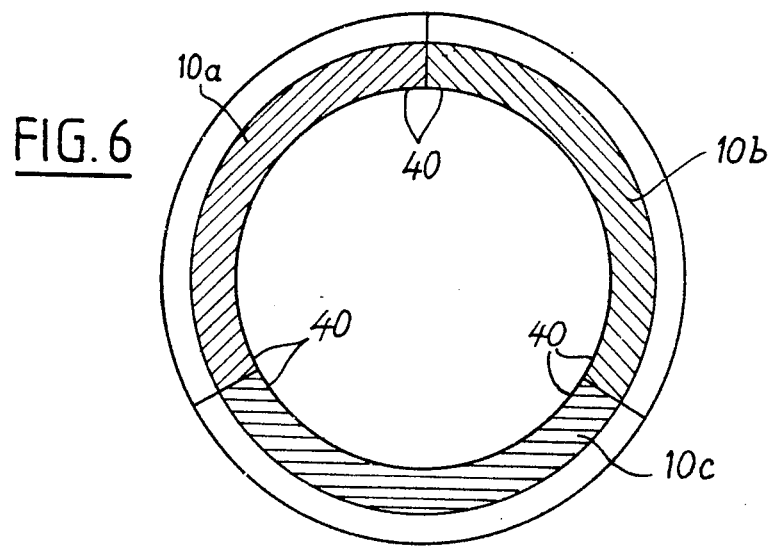
FIG. 6 is a diagrammatic view of the manner in which the elements of the tool according to the invention are united for surfacing the raceways of the rolling bearing.

As is shown diagrammatically in FIG. 3, there is used a tool 10 which is in the form of three elements or "jaws" 10a, 10b and 10c (FIG. 6) arranged in the manner of a chuck so as to define, when they are in adjoining relation to one another, a circular central orifice. It is clear that the number of three jaws is mentioned merely by way of example. These jaws are placed in a press and, when they are subjected to centripetal forces, the three jaws 10a, 10b, 10c come into contact with one another and exert a pressure against the flanks and mark out the racewways which the balls of a ball bearing will roll along, as is clear from the partial meridian sectional view of FIG. 4. In the illustrated embodiment, the raceways of the inner ring are formed in this way. The raceways are thus burnished, polished and the metal is work hardened.

In order to avoid deforming the ring when the latter is struck by the jaws, a shaft 20 (FIGS. 2 and 4) is placed inside this ring so as to absorb a part of the forces. It is clear that any other method performing the same function may be used.

If the procedure just described is adopted, there are found in the region of the joint planes of the three jaws constituting the tool 10, marks, for example in the form of small beads or the like, owing to the upsetting of the material. It is clear that such small beads constitute irregularities in the raceways along which the balls roll and result in small jumps upon each passage of a ball. These irregularities in the rolling action adversely affect correct operation and moreover produce vibrations and accelerate wear. This is why this type of defect is unacceptable and, if another way of proceeding is not adopted, the method just mentioned would not be in itself suitable for manufacturing rolling bearings satisfying the majority of the requirements of utilization.

In order to eliminate these defects of the raceways which have an adverse effect on correct operation, it is arranged, in accordance with the invention, that the raceways just formed present not projections but depressions in the vicinity of the joint planes of the three jaws 10a, 10b, 10c of the tool 10. This is one of the features of the invention. As seen in particular in FIG. 3, there are formed projections 40 on each of the jaws of the tool in the vicinity of its joint planes and in regions which will contribute to the formation and the shaping of the circular raceways along which the balls will roll. In this partial Figure, only one of the projections is seen.

Figure 5:
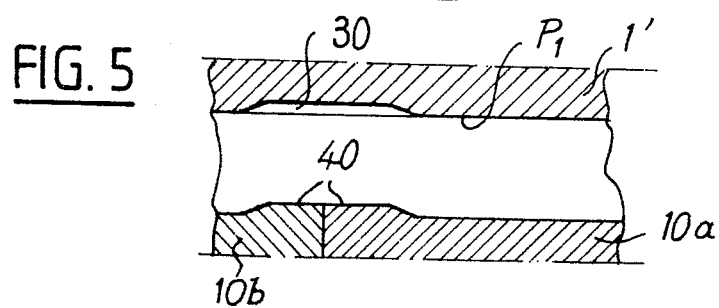
FIG. 5 is a developed partial cross-sectional view in a plane perpendicular to the contact raceway showing the profiles of a raceway and of the tool for obtaining the latter in the vicinity of assembly planes when they are joined.

If FIG. 5 is examined, it will be understood how the tools 10a and 10b operate. As can be seen in particular in FIG. 5, the raceways thus shaped have a hollow or recess, a depression 30. As a result of this structure, the balls are no longer pre-stressed when they travel through these regions and any possible defects in the raceway will no longer adversely affect the correct operation of the bearing. The particular interest of the method according to the invention and that of the tool specially designed for carrying out the method are thus clear.

It must be understood that the embodiment of the three subject matters of the invention have been described in respect of the shaping of the inner ring. However, nothing opposes the use of the same method, after the necessary adaptations, for producing the outer ring of the rolling bearing according to the invention.

Figure 7:
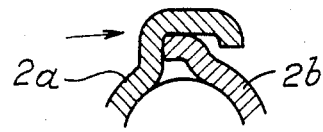
FIG. 7 is a partial detail view of a modification of the ring which is in two parts sliding one inside the other.

FIG. 7 is a partial view of the parts of the ring which freely slide one inside the other. In this embodiment, it is clear that the edge portion of the part 2a terminates in a hooked portion obtained by forming over or rolling, for example, so as to limit the extent of the possible extension of the two elements relative to each other, and also to render them inseparable.

Figure 8:
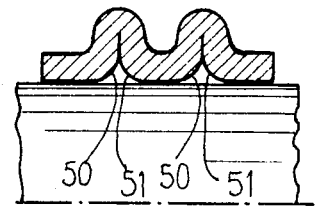
FIG. 8 is a partial cross-sectional view in a meridian plane of a modification of a ring obtained in accordance with the invention.

FIG. 8 illustrates a modification of a ring obtained according to the invention. The operation for forming the ring 1" has been carried out in such manner that the confronting inner surfaces 50 and 51 of the adjoining chevrons of the inverted W-section are applied in contact with each other. This provides the highest possible rigidity, and, for a given overall length, the largest possible bearing on the shaft.

It is clear that the Figures of the drawings are diagrammatic illustrations and the structure represented is not drawn to scale, since it is only intended to explain the invention.

The invention has a particular application in the automobile industry.

What is claimed is:

1. A pre-stressed rolling bearing comprising a case, an inner ring, an outer ring, rolling balls disposed between the inner and outer rings, at least one elastically yieldable element compressed and thus prestressed in the case between the case and one of the rings for applying the rolling members in contact with the inner rings and outer rings along circular raceways on the rings, each ball travelling along four raceways, two of said raceways being located on the inner ring and two of said raceways being located on the outer ring, one of said rings comprising two parts on each of which parts is located one of the two raceways of said one ring, said ring parts being freely movably engaged one inside the other whereby to transmit the pre-stress of the elastically yieldable element to the balls, and set-back depressions being provided on the raceways to ensure that a pre-stressing of the balls is locally avoided.

2. A rolling bearing according to claim 1, wherein said freely movable engagement of said two parts of said one ring is achieved by an axial cylindrical sliding engagement between said parts.

3. A rolling bearing according to claim 1, wherein one of said parts of said one ring includes a flange which limits an outer relative displacement between said parts.

4. A rolling bearing according to claim 1, wherein said one ring comprising two parts is said outer ring.

5. A rolling bearing according to claim 1, wherein said one ring comprising two parts is said inner ring.

6. A rolling bearing according to claim 1, wherein the ring other than said ring comprising two parts has an inverted W meridian sectional shape forming an accordeon fold, and confronting surfaces of adjoining chevrons in said inverted W shape are applied in contact with each other.

7. A rolling bearing according to claim 1, wherein a gap of predetermined magnitude is provided between an outer surface of the outer ring and an inner surface of the case.

* * * * *